United States Patent [19]

Baresel et al.

[11] 4,140,749
[45] Feb. 20, 1979

[54] METHOD OF TREATING VEHICLE EXHAUST GAS AND CATALYST USED THEREIN

[75] Inventors: Detlef Baresel, Stuttgart; Peter Scharner, Leonberg-Gebersheim; Gerhard Huth, Stuttgart, all of Fed. Rep. of Germany

[73] Assignee: Robert Bosch GmbH, Stuttgart, Fed. Rep. of Germany

[21] Appl. No.: 804,623

[22] Filed: Jun. 8, 1977

[30] Foreign Application Priority Data

Jun. 18, 1976 [DE] Fed. Rep. of Germany ....... 2627454

[51] Int. Cl.$^2$ ...................... B01D 53/34; B01J 23/78; B01J 23/86; B01J 21/04
[52] U.S. Cl. ............................ 423/213.5; 252/455 R; 252/465; 252/468; 252/470; 423/239
[58] Field of Search .................. 252/455 R, 465, 468, 252/470; 423/213.5, 239

[56] References Cited

U.S. PATENT DOCUMENTS

| | | | |
|---|---|---|---|
| 2,408,140 | 9/1946 | Gutzeit | 252/470 X |
| 3,957,691 | 5/1976 | Adachi et al. | 252/470 X |

*Primary Examiner*—W. J. Shine
*Attorney, Agent, or Firm*—Flynn & Frishauf

[57] ABSTRACT

The present invention provides a catalyst for converting the noxous CO, $NO_x$ and hydrocarbons found in the exhaust gases from internal combustion engines into less harmful gases, and to the method of treating said exhaust gases. The catalyst consists essentially of a solid solution of $Fe_2O_3$, $Cr_2O_3$, and $Fe_3O_4$. The catalyst may be extended on a porous carrier such as aluminum oxide or aluminum silicate. The catalyst is particularly suited for treating the exhaust gas from internal combustion engines of motor vehicles.

24 Claims, No Drawings

METHOD OF TREATING VEHICLE EXHAUST GAS AND CATALYST USED THEREIN

BACKGROUND OF THE INVENTION

Noble metal catalysts extended on carriers, such as $Al_2O_3$-$SiO_2$ carriers coated with Pt or Pt/Rh have been disclosed as useful for the removal of pollutants present in truck motor exhaust gases, such as carbon monoxide (CO), nitrogen oxide ($NO_x$), and hydrocarbons. Such catalysts maintain the requisite activity for about 880 hours which corresponds to about 40,000 km, provided the motors are driven with lead-free and halogen-free fuel. When using such noble metal catalysts, the ease of poisoning by lead and halides creates a problem. In addition, the noble metals are costly and scarce.

Several transition metal oxides, for example, $Cr_2O_3$ and $Fe_2O_3$ in the form of chromites and ferrites, and mixtures of $Fe_2O_3$ and $Cr_2O_3$, are known to catalyze the reaction (1)

$$Co + NO \rightarrow CO_2 + \tfrac{1}{2} N_2 \qquad (1)$$

which eliminates CO and $NO_x$ from motor vehicle exhaust gases, e.g., from motor truck exhaust gases.

No catalysts with adequate activity and service life are known which will catalyze the aforedescribed reaction (1) and simultaneously catalyze the oxidation of hydrocarbons illustrated in the following reaction (2)

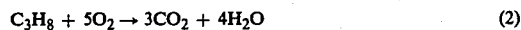

$$C_3H_8 + 5O_2 \rightarrow 3CO_2 + 4H_2O \qquad (2)$$

with the exception of those containing some noble metal content, for example, the embedded catalysts. By "adequate activity" is meant a reduction of the CO content to 0.3% by volume; $NO_x$ content to 250 ppm; and hydrocarbon content to 50 ppm.

It is an object of the invention to provide a catalyst having an $Fe_2O_3$-$Cr_2O_3$ base that has an adequate activity and service life which is particularly useful for scavenging truck engine exhaust gases.

SUMMARY OF THE INVENTION

The present invention provides an improved catalyst for treating the exhaust gases from motor vehicles, particularly trucks, to remove therefrom at least part of the CO, $NO_x$, and hydrocarbons. The catalyst contains $Fe_2O_3$ and $Cr_2O_3$ in the form of a solid solution, which solid solution also contains $Fe_3O_4$. The $Fe_3O_4$ is preferably in an amount between about 20 and 50 mol percent based on the total iron oxide content of the catalyst. The minimum amount of $Fe_3O_4$ is that amount such that the resulting catalyst has "adequate activity" as defined hereinbefore.

The catalyst preferably also has a $Fe_2O_3$:$Cr_2O_3$ ratio between about 15:1 and 0.3:1, preferably between about 1:1 and 0.7:1.

The catalyst may also contain iron and/or chromium powder of a very small particle size (grain diameter < 100 μm), preferably in an amount of from about 1% to 15% by volume of the iron and/or chromium powder based on the total amount of $Fe_2O_3$-$Cr_2O_3$. The addition of the iron and/or chromium powder only increases the mechanical stability of the catalysts after sintering, which is particularly important when the catalyst is not supported on a carrier or other substrate, but is used in the form of full contact pellets or the like.

It is particularly advantageous for the catalyst to also contain barium oxide which has the effect of improving the rate of oxidation of the hydrocarbons. The amount of barium oxide is between about 1% and 15 mol percent, based on the total oxides in the catalyst. Similarly potassium oxide and/or lithium oxide may be used together with or in place of the barium oxide, in the same range of percentages.

In a preferred embodiment of the invention, the catalyst is embedded in or otherwise extended on or supported by a carrier (preferably a porous carrier) such as aluminum oxide and/or aluminum silicate.

The invention also provides an improved treatment of exhaust gases from vehicle engines, particularly truck engines, to reduce the amount of CO, $NO_x$, and hydrocarbons to not more than about 0.3% by volume of the CO content, and $NO_x$ content of not more than about 250 ppm (parts per million), and a hydrocarbon content of not more than about 50 ppm. The process is carried out by placing the catalyst in a container such as a "catalytic converter" which is placed in the exhaust system of the motor vehicle, e.g. a truck. The exhaust gases are passed over the catalyst, for example as disclosed in U.S. Pat. No. 3,656,915.

The catalyst in the form of the mixture of oxides and solid solution may be prepared by the methods which are well-known in the art, such as the wet precipitation method illustrated in the Examples. The $Fe_3O_4$ may be formed by partial reduction of the $Fe_2O_3$ component of an admixture therewith $Cr_2O_3$ by contact with hydrogen at a temperature between about 100° C. and 1,000° C. This produces an improved initial catalytic activity and improves the service life of the catalyst.

The invention is further illustrated with reference to the following Examples:

EXAMPLE 1

259 grams of $Fe(NO_3)_3.9\,H_2O$ and 257 grams of $Cr(NO_3)_3.9\,H_2O$ were dissolved in 5 liters of water and at 80° C. the hydroxide was precipitated with ammonia. The precipitate was then recovered by filtering and the filtration residue was twice rinsed with water and dried at about 300° C. The solid dry product was then sintered at 900° C. for 1 hour. It was then stirred into a paste with water and polyvinyl alcohol and pressed in a tablet press to form pills of 4 mm diameter and 2 mm thickness. The pills were then dried for 2 hours at 110° C. and then sintered for two hours at 1150° C. The product consists essentially of a solid solution of $Fe_2O_3$ and $Cr_2O_3$ and with only a small content of $Fe_3O_4$ components which is produced by the weak reduction of some $Fe_2O_3$ during sintering in air by the carbon or carbon monoxide from the polyvinyl alcohol. This catalyst, produced for comparison purposes, corresponds to the prior art.

EXAMPLE 2

The pills obtained following the procedures of Example 1 to the pill-pressing stage, were reduced in an argon-hydrogen stream (10% $H_2$) at 900° C. and a product obtained in which about 50% of the iron is present as $Fe_3O_4$. Such a product is obtained with that reducing agent at that temperature when the reduction treatment lasts between one and two hours.

EXAMPLE 3

The procedure of Example 1 is carried out down through the stage of drying at 300° C., and than a two-hour presintering at 1100° C. was carried out. The dry powder was then mixed with 3% by volume (about 7 grams) of the purest available iron powder, e.g. made of iron carbonyl, having a grain size between 10 and 100μ, preferably 30 μm, and this mixture was made into a paste with water and then dried at about 300° C. Thereafter, it was stirred in water in polyvinyl alcohol to make a viscous mass from which pills were again produced in the manner described in Example 1.

EXAMPLE 4

The procedure of Example 1 was carried out through the stage of sintering at 900° C. Thereafter, a solution of 15.6 grams Ba(NO$_3$)$_2$ in 70 ml of water was impregnated into the oxide mixture and thoroughly mixed with 1 gram of polyvinyl alcohol. The mass was then dried for two hours at about 250° C., pulverized, and pressed into pills. The pills were then sintered for 2 hours at 1100° C.

EXAMPLE 5

Like Example 4, but 0.827 g LiNO$_3$ instead of Ba(NO$_3$)$_2$.

EXAMPLE 6

The procedure of Example 1 followed through the stage of drying at 300° C. The solid dry product was pulverized and blended thoroughly with 2% by volume of iron powder made of iron carbonyl, 10.4 grams of Ba(NO$_3$)$_2$ and 10 ml of a 10% solution of polyvinyl alcohol in water, for 1 hour. The mass was then dried over a period of 4 hours at a temperature that was 120° C. at the beginning and rose during the course of the 4 hours to 250° C. The dried material was pulverized and tablets were made from the powder in a tablet press which were then treated for 2 hours in an argon-hydrogen stream (10%H$_2$) at 700° C.

EXAMPLE 7

Like example 6 but 0.414 g LiNO$_3$ instead of Ba(NO$_3$)$_2$

EXAMPLE 8

Like example 6 but 5.2 g Ba(NO$_3$)$_2$ and 0.413 g LiNO$_3$ instead of 10.4 g Ba(NO$_3$)$_2$ solely.

EXAMPLE 9

A catalyst fixed on a carrier was prepared as follows: An aqueous solution of iron nitrate, chromium nitrate, and barium nitrate (113 g Fe(NO$_3$)$_3$·9H$_2$O; 160 g Cr(NO$_3$)$_3$·9H$_2$O; 7.8 g Ba(NO$_3$)$_2$ in 500 ml H$_2$O) was applied to an aluminum oxide porous carrier and also to a porous carrier. The solution was applied by soaking 10–14 times, with a drying step at 200° C. intervening between every two soakings, and also after the last soaking. Then the carrier with its superficial oxide and/or hydroxide mixture was sintered at 1000° C. in air for 2 to 3 hours and then treated with hydrogen at 400° C. to 500° C. in an argon-hydrogen stream (10% H$_2$) for 2 hours.

The results obtained with the products of Examples 1–9 are reported in the following Table. As a measure for the activity of the catalyst, the conversion velocity $r$ at constant temperature and volumetric velocity is given. It results from the solution of the equation $$\frac{dc}{dt} = r = k \cdot c \cdot w;$$

$$r = \int_{c_o}^{c} \frac{dc}{c} = \int_{t_o}^{t} k \cdot w \cdot dt = \frac{\log \frac{c}{c_o}}{w} = \frac{k \cdot \Delta t}{2{,}302} = \frac{\log \% \text{ conversion}}{w}$$

with
$t$ = time
$K$ = equilibrium constant of reaction (1) resp. (2) of p. 2
$c$ = concentration of CO resp. CH
$w$ = weight of catalyst
$c_o$ = initial concentration and takes into account the different weights of the catalyst samples. The higher $r$, the more active is the catalyst. If $r \geq 0.3$ the "adequate activity" in the sense of the definition hereinbefore is reached in the experimental arrangement.

Example 1 stands only for comparison purpose as mentioned in the last sentence of Example 1; The following examples show the improvement by the additional step of preparation or additions.

TABLE

Conversion velocity r of the reactions (1) and (2) with catalyst based on Fe$_2$O$_3$ · Cr$_2$O$_3$ after one hour and 100 hours of operation (volumetric velocity 60,000 h$^{-1}$) follows:

| Example | Treatments or Additions to Fe$_2$O$_3$ · Cr$_2$O$_3$ = 1:1 | r for NO/CO at 300° C. 1 h | 100 h | r for HYDROCARBONS at 400° C. 1 h | 100 h |
|---|---|---|---|---|---|
| 1 | — | 0.3502 | 0.32914 | 0.27396 | 0.28167 |
| 2 | reduction with H$_2$ | 0.43410 | 0.42689 | 0.27848 | 0.29758 |
| 3 | with 3 Vol% iron powder | 0.27870 | 0.34454 | 0.16511 | 0.14682 |
| 4 | with 6 Mol% BaO | 0.33770 | 0.32330 | 0.24759 | 0.25417 |
| 5 | with 6 Mol% Li$_2$O | 0.28934 | 0.30568 | 0.28567 | 0.30890 |
| 6 | with 4 Mol% BaO and 2 Vol% iron powder | 0.42676 | 0.43931 | 0.35509 | 0.32422 |
| 7 | with 3 Mol% Li$_2$O and 2 Vol% iron powder | 0.40077 | 0.40221 | 0.30717 | 0.24574 |
| 8 | with 4 Mol% Li$_2$O, 2 Mol% BaO and 2 Vol% iron powder | 0.42501 | 0.42337 | 0.32422 | 0.37055 |
| 9 | Fe$_2$O$_3$:Cr$_2$O$_3$ = 0,7 with 3 Mol% BaO on Al$_2$O$_3$-Carrier, reduction with H$_2$ for 2 h | 0.49029 | 0.51009 | 0.30834 | 0.36536 |

From the Table it can be seen that prior art catalyst (Example 1) does produce an adequate lowering of the nitrogen oxide and carbon monoxide content, but is not suited for an adequate elimination of the hydrocarbons. Example 2 shows the improvement by reduction with hydrogen. Example 3 shows, that the mechanical hardening by iron powder, which is necessary, if full contact catalyst pellets are desired, lowers the activity for the transformation of both groups of noxious matter. This activity can be enhanced by the addition of Li$_2$O or BaO, shown by Example 4, 5, 6 and 7. The mixed addition of Li$_2$O and BaO to Fe$_2$O$_3$/Cr$_2$O$_3$ with iron powder shows a further improvement (Example 8). The best catalyst can be made by impregnation of porous alumina carrier with $Fe_2O_3$ and $Cr_2O_3$ in a proportion 0.7:1, BaO and a short reduction by hydrogen (Example 9).

The catalysts of the present invention and the process of the present invention utilizing said catalysts have the advantage that the CO, $NO_x$, and hydrocarbon contents of motor vehicle exhaust gases are simultaneously reduced to the critical level referred to hereinbefore as the level of adequate activity. Furthermore these catalysts will not be damaged after an operation of 100 hours in the exhaust gas of motor vehicles; several catalyst specimens reach, in contrary to the inhibition, a better activity by finding out during working the best arrangement of their surface for this process. This is a well known experience in catalysis. The catalyst of the present invention have the further advantage that their activity is not substantially impaired by the additives present in high tests (octane) fuels, such as chlorine, lead, phosphorus, and sulfur compounds. There is the further advantage that the catalyst is inexpensive relative to the costs of noble metal catalysts and in contrast to the latter can be produced in unlimited quantities.

We claim:

1. An internal combustion exhaust gas catalyst for simultaneously reducing the CO, $NO_x$, and the hydrocarbon content of the exhaust gases from internal combustion engines, particularly motor vehicles, consisting essentially of a solid solution of $Fe_2O_3$ and $Cr_2O_3$ which also contains an amount of $Fe_3O_4$ sufficient to reduce the hydrocarbon content of said exhaust gases, and between about 1 and 15 mol % of at least one oxide selected from the group consisting of barium oxide, potassium oxide, and lithium oxide.

2. The catalyst of claim 1 wherein the ratio of $Fe_2O_3:Cr_2O_3$ is between about 1.5:1 and 0.3:1.

3. The catalyst of claim 2 containing between about 20 and 50 mol % of $Fe_3O_4$ based on the total iron oxide content.

4. The catalyst of claim 1 wherein said oxide is barium oxide.

5. The catalyst of claim 2 where said oxide is barium oxide.

6. The catalyst of claim 3 which also contains between about 1 and 15 mol % of barium oxide.

7. The catalyst of claim 3 which also contains between about 1 and 15% by volume of at least one powdered metal selected from the group consisting of iron and chromium based on the total amount of $Fe_2O_3$ and $Cr_2O_3$.

8. The catalyst of claim 1 which also contains between about 1 and 15% by volume of at least one powdered metal selected from the group consisting of iron and chromium based on the total amount of $Fe_2O_3$ and $Cr_2O_3$.

9. The catalyst of claim 1 extended on a porous substrate which is at least one material selected from the group consisting of aluminum oxide and aluminum silicate.

10. An internal combustion exhaust gas catalyst for simultaneously reducing the CO, $NO_x$, and the hydrocarbon content of the exhaust gases from internal combustion engines, particularly motor vehicles, consisting essentially of a solid solution of $Fe_2O_3$ and $Cr_2O_3$ which also contains an amount of $Fe_3O_4$ sufficient to reduce the hydrocarbon content of said exhaust gases, and at least one powder selected from the group consisting of iron and chromium.

11. The catalyst of claim 10 containing between about 20 and 50 mol % of $Fe_3O_4$ based on the total iron oxide content.

12. The catalyst of claim 10 extended on a porous substrate which is at least one material selected from the group consisting of aluminum oxide and aluminum silicate.

13. A method for reducing the quantity of CO, $NO_x$, and hydrocarbons found in exhaust gases from internal combustion engines comprising contacting the said exhaust gases with the catalyst claimed in claim 2.

14. A method for reducing the quantity of CO, $NO_x$, and hydrocarbons found in exhaust gases from internal combustion engines comprising contacting the said exhaust gases with the catalyst claimed in claim 3.

15. A method for reducing the quantity of CO, $NO_x$, and hydrocarbons found in exhaust gases from internal combustion engines comprising contacting the said exhaust gases with the catalyst claimed in claim 1.

16. A method for reducing the quantity of CO, $NO_x$, and hydrocarbons found in exhaust gases from internal combustion engines comprising contacting the said exhaust gases with the catalyst claimed in claim 10.

17. A method for reducing the quantity of CO, $NO_x$, and hydrocarbons found in exhaust gases from internal combustion engines comprising contacting the said exhaust gases with the catalyst claimed in claim 11.

18. A method for reducing the quantity of CO, $NO_x$, and hydrocarbons found in exhaust gases from internal combustion engines comprising contacting the said exhaust gases with the catalyst claimed in claim 4.

19. A method for reducing the quantity of CO, $NO_x$, and hydrocarbons found in exhaust gases from internal combustion engines comprising contacting the said exhaust gases with the catalyst claimed in claim 5.

20. A method for reducing the quantity of CO, $NO_x$, and hydrocarbons found in exhaust gases from internal combustion engines comprising contacting the said exhaust gases with the catalyst claimed in claim 6.

21. A method for reducing the quantity of CO, $NO_x$, and hydrocarbons found in exhaust gases from internal combustion engines comprising contacting the said exhaust gases with the catalyst claimed in claim 7.

22. A method for reducing the quantity of CO, $NO_x$, and hydrocarbons found in exhaust gases from internal combustion engines comprising contacting the said exhaust gases with the catalyst claimed in claim 8.

23. A method for reducing the quantity of CO, $NO_x$, and hyrocarbons found in exhaust gases from internal combustion engines comprising contacting the said exhaust gases with the catalyst claimed in claim 12.

24. A method for reducing the quantity of CO, $NO_x$, and hydrocarbons found in exhaust gases from internal combustion engines comprising contacting the said exhaust gases with the catalyst claimed in claim 9.

* * * * *